United States Patent
Yang et al.

(10) Patent No.: US 6,671,428 B1
(45) Date of Patent: Dec. 30, 2003

(54) WAVELENGTH SELECTIVE OPTICAL CROSS SWITCH AND OPTICAL ADD/DROP MULTIPLEXER USING VOLUME PHASE GRATING AND ARRAY OF MICRO ELECTRO MECHANICAL MIRRORS

(75) Inventors: Wei Yang, Fremont, CA (US); Shu Zhang, Fremont, CA (US); Li Chen, Fremont, CA (US)

(73) Assignee: Bayspec, Inc., Fremont, CA (US)

( * ) Notice: Subject to any disclaimer, the term of this patent is extended or adjusted under 35 U.S.C. 154(b) by 312 days.

(21) Appl. No.: 09/813,772

(22) Filed: Mar. 20, 2001

Related U.S. Application Data

(60) Provisional application No. 60/250,868, filed on Dec. 1, 2000.

(51) Int. Cl.[7] ............................. G02B 6/26; G02B 6/42; G02B 6/34
(52) U.S. Cl. ........................................ 385/18; 385/37
(58) Field of Search ................ 385/16–18, 37, 385/31, 33–35

(56) References Cited

U.S. PATENT DOCUMENTS

| | | | | |
|---|---|---|---|---|
| 5,960,133 A | * | 9/1999 | Tomlinson | 385/18 |
| 6,097,859 A | * | 8/2000 | Solgaard et al. | 385/17 |
| 6,108,471 A | * | 8/2000 | Zhang et al. | 385/37 |
| 6,236,774 B1 | * | 5/2001 | Lackritz et al. | 385/14 |
| 6,253,001 B1 | * | 6/2001 | Hoen | 385/17 |
| 6,445,844 B1 | * | 9/2002 | Neukermans et al. | 385/18 |
| 6,501,877 B1 | * | 12/2002 | Weverka et al. | 385/31 |

* cited by examiner

Primary Examiner—Edward J. Glick
Assistant Examiner—Thomas R Artman
(74) Attorney, Agent, or Firm—Justin Boyce; Chung Park; Dechert LLP

(57) ABSTRACT

An optical cross switch device for selectively switching light beams between a plurality of fiber optic elements. The device includes an input fiber mounting assembly for securing at least one input fiber terminating in a fiber end for radiating an associated input light beam; collimating means for collimating the at least one input light beam; focusing means for focusing light beams incident thereon; an output fiber mounting assembly for securing at least one output fiber terminating in an output fiber end for receiving an associated light beam; and at least one mirror unit having at least one reflective element for selectively redirecting an associated one of the collimated input light beams toward an associated selected one of the output fiber ends via the focusing means.

19 Claims, 8 Drawing Sheets

WAVELENGTH SELECTIVE OPTICAL CROSS SWITCH AND OPTICAL ADD/DROP MULTIPLEXER USING VOLUME PHASE GRATING AND ARRAY OF MICRO ELECTRO MECHANICAL MIRRORS

REFERENCE TO EARLIER APPLICATIONS

Reference is made and priority claimed to U.S. Provisional Application Serial No. 60/250,868, filed Dec. 1, 2000, entitled "Wavelength Selective Optical Cross Switch and Optical Add/Drop Multiplexer using Volume Phase Grating in Conjunction with N×N Micro Electro Mechanical Mirrors".

BACKGROUND OF THE INVENTION

1. Field of the Invention

The present invention relates generally to a method and apparatus for wavelength selective optical switching and multiplexing/demultiplexing, and more particularly to a wavelength selective optical switch providing improved transmission capacity.

2. Description of the Prior Art

The explosive growth of telecommunication and computer networking, especially in the area of the Internet, has created a dramatic increase in the volume of data traffic worldwide, which has placed an increasing demand for communication networks to provide more and more bandwidth. To meet this demand, fiber optic (light wave) communication systems have been developed in order to harness the enormous usable bandwidth (tens of tera-Hertz) of a single optical fiber transmission link. Because it is not possible to exploit all of the bandwidth of an optical fiber using a single high capacity channel, wavelength division-multiplexing (WDM) fiber optic systems have been developed to provide transmission of multi-carrier signals over a single optical fiber thereby increasing the bandwidth of the fiber dramatically. In accordance with WDM technology, a plurality of concurrent signals with different wavelengths are superimposed and transmitted over a single fiber. WDM technology takes advantage of the relative ease of signal manipulation in the wavelength, or optical frequency domain, as opposed to the time domain. In WDM networks, optical transmitters and receivers are tuned to transmit and receive on a specific wavelength, and many signals operating on distinct wavelengths share a single fiber.

Wavelength multiplexing devices are commonly used in fiber optic communication systems to generate a single multi-carrier signal, in response to a plurality of concurrent signals having different wavelengths received from associated sources or channels, for transmission via a single fiber. At the receiving end, wavelength demultiplexing devices are commonly used to separate the composite wavelength signal into several original signals of different wavelengths.

Dense wavelength division multiplexing (DWDM) devices provide multiplexing and demultiplexing functions in specific wavelength ranges. Important design criteria for a DWDM device include a large number of channels, narrow channel spacing, low inter-channel cross talk, low insertion loss, low polarization dependency, compactness, environmental stability, and low manufacturing cost.

The explosive growth of telecommunications, computer communications and the internet has placed increasing demand on national and international communication networks. The worldwide growth in the volume of data transmitted through existing communication systems has created a demand for a multi gigabit capacity transmission network with high efficient crossconnecting. A multi-channel switch that is capable of accommodating switching tasks from a large number of fiber channels to another large number of fiber channels is needed to meet this demand. A critical component in any communication system is the switch by which the communication system uses to cross connect between two or more signal carrying channels. In fiber optic communication systems, an optical switch is a device that is capable of rapidly switching selected data carrying beams from one of the optical fibers of an input fiber array to an optical fiber of an output fiber array. Therefore an optical switch with a high speed, low transmission loss and high reliably is desirable.

Conventional optical switch designs envision the use of a number of fixed fibers in conjunction with an array of moveable fibers which are either translated or rotated in to optical alignment with one of the fixed fibers by mechanical means. Complex and cumbersome mechanical mechanisms are currently used in order to perform optical switching. Furthermore, switches are currently only able to align one moveable fiber with one fixed fiber at a time.

What is needed is a dense wavelength division multiplexing (DWDM) device having capability of wavelength selective switching.

What is needed is a switching system that is capable of simultaneously aligning a group of signal carrying fibers with another group of signal carrying fibers.

What is also needed is a DWDM device that accommodates large transmission capacity while being small, lightweight, immune to temperature variation and stress-induced instability, and inexpensive to produce.

SUMMARY OF THE INVENTION

It is therefore an object of the present invention to provide a dense wavelength division multiplexing (DWDM) device having capability of wavelength selective switching.

It is also an object of the present invention to provide a DWDM device that accommodates large transmission capacity while being small, lightweight, immune to temperature variation and stress-induced instability, and inexpensive to produce.

Briefly, a presently preferred embodiment of the present invention provides an optical cross switch device for selectively switching light beams between a plurality of fiber optic elements. The device includes: an input fiber mounting assembly for securing at least one input fiber terminating in a fiber end for radiating an associated input light beam; collimating means for collimating the input light beam; focusing means for focusing light beams incident thereon; an output fiber mounting assembly for securing at least one output fiber terminating in an output fiber end for receiving an associated light beam; and at least one mirror unit having at least one reflective element for selectively redirecting an associated one of the collimated input light beams toward an associated selected one of the output fiber ends via the focusing means. Wherein the focusing means includes a lens and an auto-focusing and tracking mechanism operative to focus the redirected light beams. The reflective element being selectively rotatable about two substantially perpendicular axes for redirecting light beams incident thereon, wherein the reflective element is flexibly mounted on a substrate such that the angle of rotation of the reflective element is controlled by the application of voltage between a portion of the reflective element and a portion of the substrate. Alternatively, the focusing means may include an array of focusing lenses, and the collimating means may include an array of collimating lenses.

In one accordance with one aspect of the present invention, the device functions as a wavelength selective cross switch and add/drop multiplexer wherein the input light beam is a multi-channel beam. In accordance with one aspect of the present invention, the device further includes a transmissive grating for diffracting the multi-channel beam into a plurality of spatially separated single channel beams; and at least one mirror unit having at least one reflective element for selectively redirecting an associated one of the single-channel beams toward a selected one of the output fiber ends via the focusing means. In accordance with one aspect of the present invention, the transmissive grating includes a diffractive element formed from a photosensitive medium such as a photo-polymer material.

IN THE DRAWINGS

DETAILED DESCRIPTION OF THE PREFERRED EMBODIMENT

Figure 1:
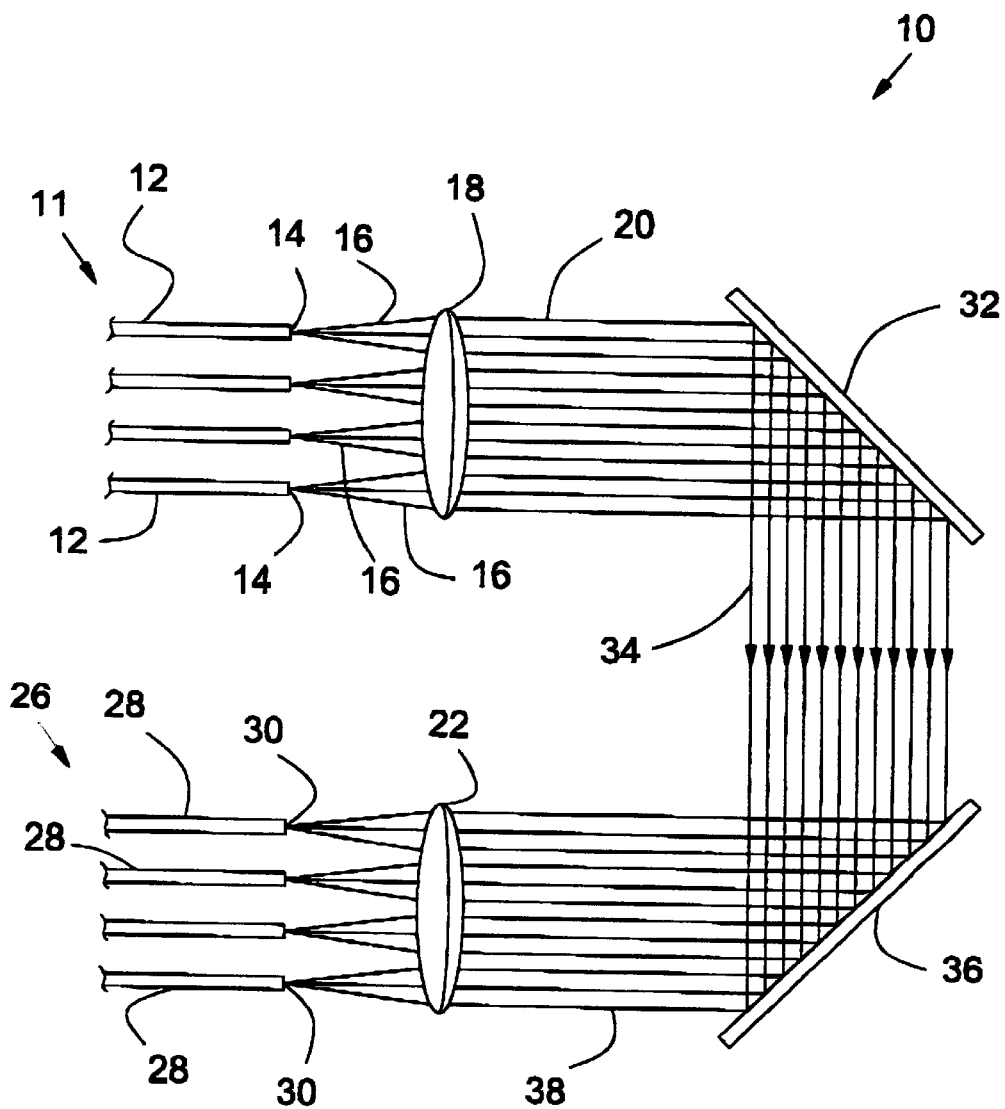
FIG. 1 is a schematic block diagram generally illustrating an optical cross-switch device in accordance with one embodiment of the present invention, the device including an input array of optical fibers, an output array of optical fibers, and a pair of micro electro mechanical mirror units.

FIG. 1 shows a schematic block diagram generally illustrating an optical cross-switch device at 10 in accordance with one embodiment of the present invention. The device 10 provides for selectively switching light beams between a plurality of fiber optic lines, and includes: an input fiber mounting assembly (not shown) for securing an input fiber array 11 including a plurality of input fibers 12 each terminating in a fiber end 14 for radiating an associated input light beam 16; a collimating lens 18 for collimating each of the input light beams 16 to provide a plurality of collimated input light beams 20; a focusing lens 22 for focusing light beams incident thereon; an output fiber mounting assembly (not shown) for securing an output fiber array 26 including a plurality of output fibers 28 each terminating in an output fiber end 30 for receiving an associated light beam; a first mirror unit 32 having at least one reflective element (not shown) for selectively redirecting an associated one of the collimated input light beams 20 to provide an associated one of a plurality of first redirected light beams 34; and a second mirror unit 36 having at least one reflective element (not shown) for receiving and for further selectively redirecting an associated one of the first redirected light beams 34 to provide an associated one of a plurality of further redirected light beams 38 toward an associated selected one of said output fiber ends 30 via said focusing lens 22. As illustrated in FIG. 1, the device 10 is operating in a mode wherein each of the reflective elements (not shown) of the mirror units 32 and 36 is selectively positioned so that the input beams are redirected to associated ones of the output fiber ends 30 without being switched. However as further explained below, the input beams may be selectively redirected toward other selected output fibers.

The collimating and focusing lenses 18 and 22 may be chosen to minimize optical aberrations such as spherical and chromatic aberrations. The focal length and diameter of the collimating lens 18 are chosen with a specific numerical aperture to match that of the input fibers 12 and the size of the reflective elements (not shown) of the first mirror unit 32. Similarly, the focal length and diameter of the focusing lens 22 are chosen with a specific numerical aperture to match that of the output fibers 28 and the size of the reflective elements (not shown) of the second mirror unit 36.

In one embodiment, the input fiber array 11 and output fiber array 26 are both 1×4 arrays. Also in an embodiment, each of the input fibers 12 and the output fibers 28 is either a multi-mode or a single mode communication fiber which is capable of transmitting optical radiation with substantially high transmittance, preferably in the wavelength ranges appropriate to fiber optic networks, such as the infrared range.

Figure 2:
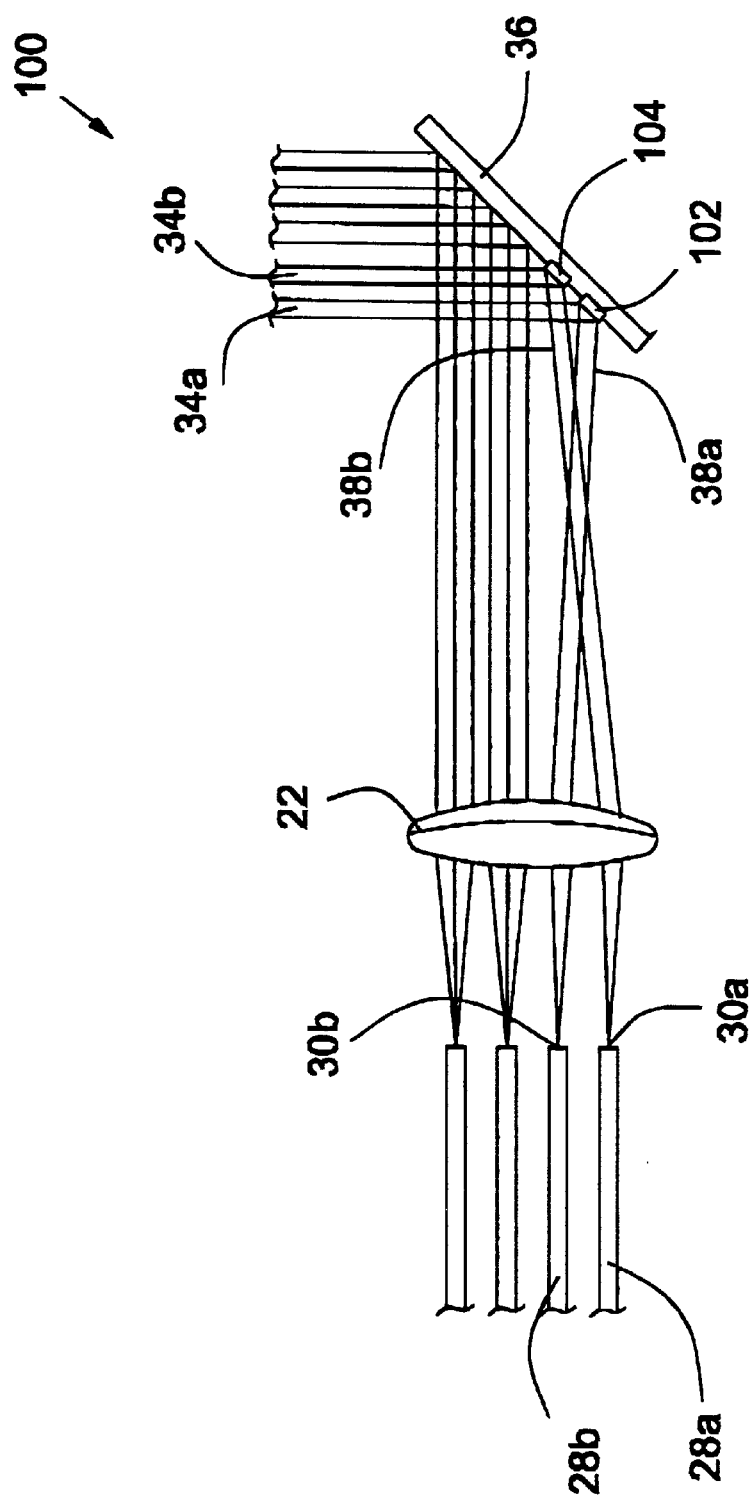
FIG. 2 is a schematic block diagram generally illustrating the operation of an output portion of the cross-switch device of FIG. 1 in accordance with one embodiment of the present invention.

FIG. 2 shows a schematic block diagram generally illustrating an output portion at 100 of the cross-switch device 10 (FIG. 1) in accordance with one embodiment of the present invention. A selected redirected beam 34a of the first redirected beams 34 is further redirected by an associated reflective element 102 of the second mirror unit 36 to provide a further redirected beam 38a that is impinged upon a selected output fiber end 30a. A selected redirected beam 34b is further redirected by an associated reflective element 104 of the second mirror unit 36 to provide a further redirected beam 38b that is impinged upon a selected output fiber end 30b.

Switching occurs when reflective element 102 is rotated so that the further redirected beam 38a impinges upon fiber end 30b and reflective element 104 is rotated such that further redirected beam 38b impinges upon fiber end 30a, thereby switching the output received by output fibers 28a and 28b.

Figure 3A:
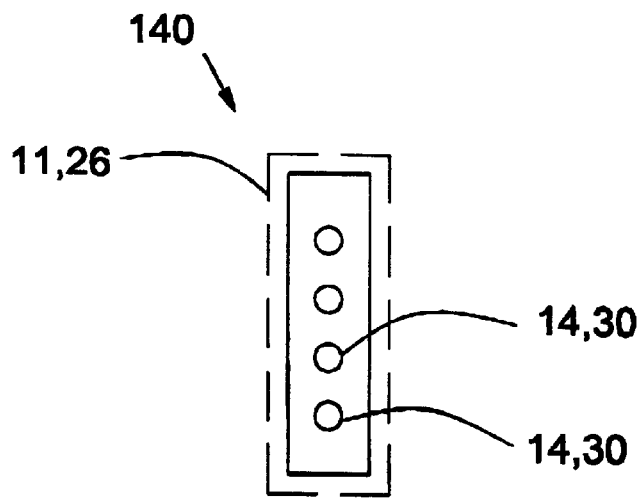
FIG. 3a is a schematic block diagram generally illustrating a first embodiment of either of the input fiber array or the output fiber array including a 1×N array of optical fibers.

FIG. 3a shows a schematic block diagram generally illustrating a first embodiment at 140 of either of the input fiber array 11 (FIG. 1) or the output fiber array 26 (FIG. 1). In the depicted embodiment the array at 140 is a 1×4 optical fiber array.

Figure 3B:
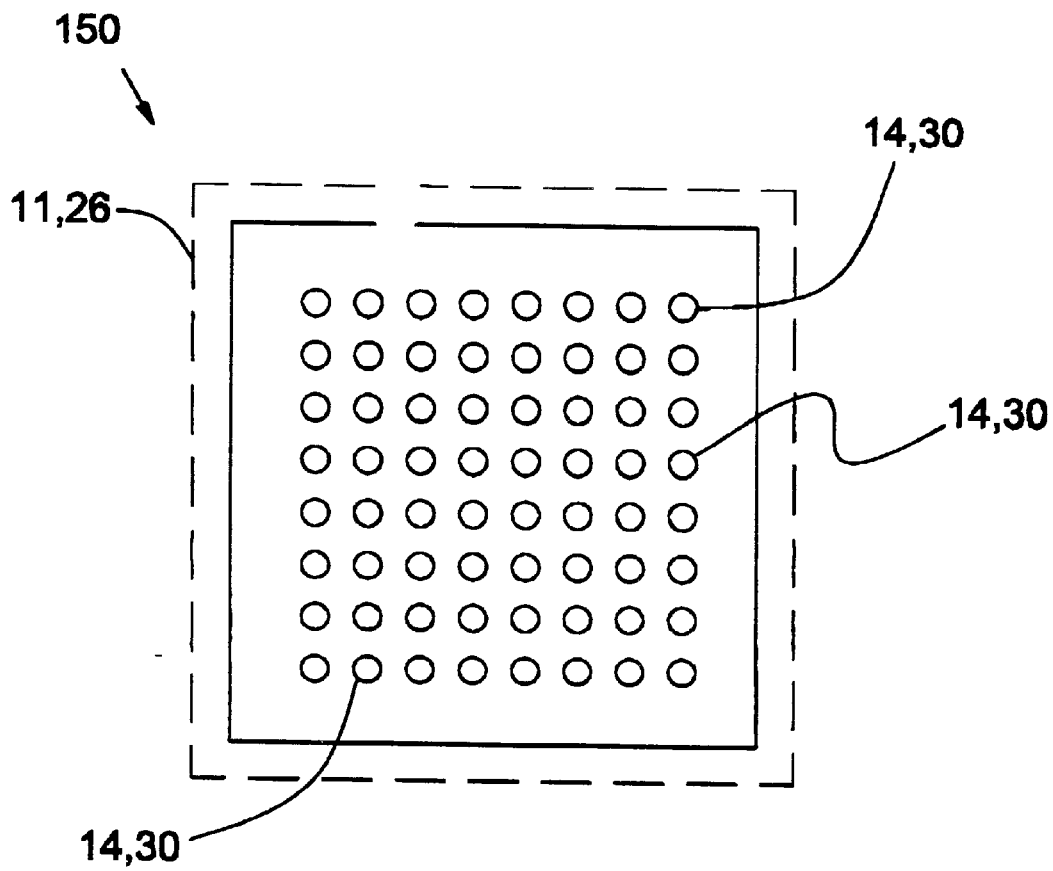
FIG. 3b is a schematic block diagram generally illustrating a second embodiment of either of the output fiber array or the input fiber array including an N×N array of optical fibers.

FIG. 3b shows a schematic block diagram generally illustrating a second embodiment at 150 of either of the output fiber array 26 (FIG. 1) or the input fiber array 11 (FIG. 1). In the depicted embodiment the array at 150 is an 8×8 optical fiber array. Similarly, an N×M array of optical fibers (not shown) may be used for the output fiber array 26 (FIG. 1) and/or the input fiber array 11 (FIG. 1), with N and M being integer values between one and one thousand.

Figure 4:
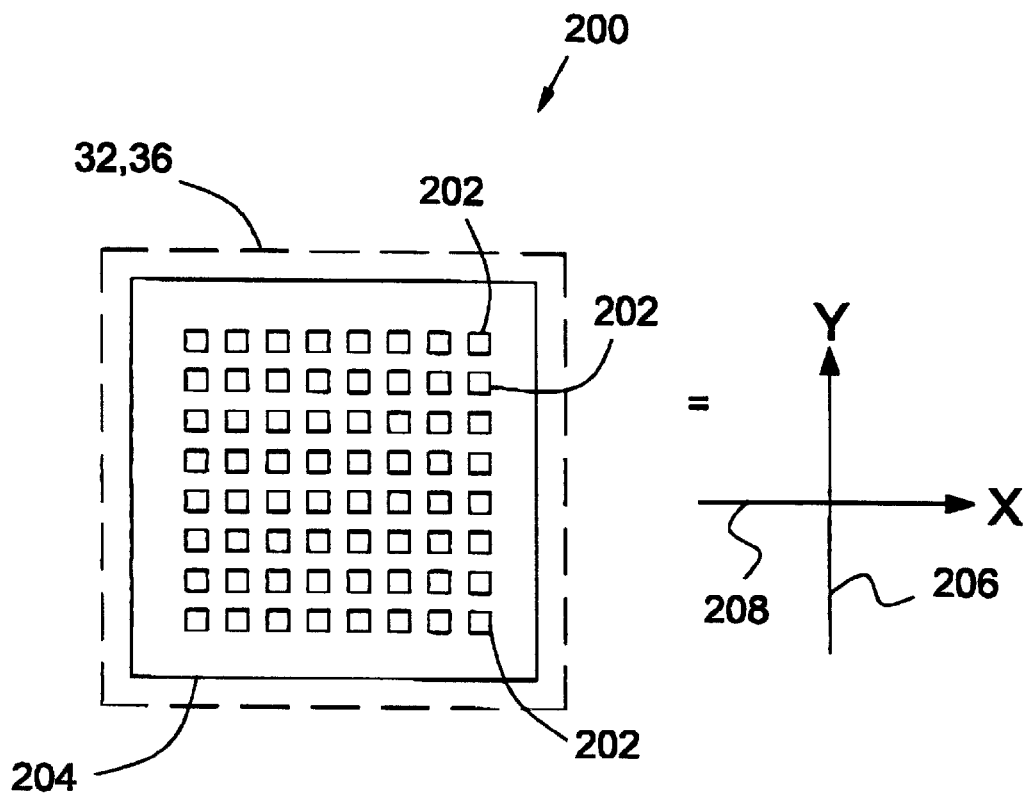
FIG. 4 is a schematic block diagram generally illustrating one embodiment of one of the mirror units of FIG. 1 including an 8×8 array of reflective elements.

FIG. 4 shows a schematic block diagram generally illustrating one embodiment at 200 of a mirror unit that may be used to implement the first mirror unit 32 (FIG. 1) or the second mirror unit 36 (FIG. 1). In the depicted embodiment, the first mirror unit includes an 8×8 array of reflective elements 202, though an array including any number of reflective elements 202 may be used.

In a preferred embodiment, the first and second mirror units 32, 36 (FIG. 1) manufactured by a micro electro mechanical systems (MEMS) technique from a single crystal SOI wafer such that the array of reflective elements 202 is formed on a substrate 204, such a technique being well known in the prior art. Each of the reflective elements 202 of the mirror unit 32 is controllably rotatable about two substantially perpendicular axes 206 and 208. A microprocessor based controller (not shown) is used to manipulate the precise angle of rotation of each of the reflective elements 202 of the arrays. An electrical potential is applied between a portion of a selected one of the reflective elements 202 and a portion of the substrate 204 upon which the selected reflective element 202 is formed in order to rotate the reflective element 202 to a desired angle. The angle of rotation may be increased by increasing the potential applied. Each reflective element 202 is coated with a reflective layer (not shown) in order to increase transmission efficiency. MEMS micro mirror arrays can be fabricated at a modest cost using well known techniques.

Figure 5:
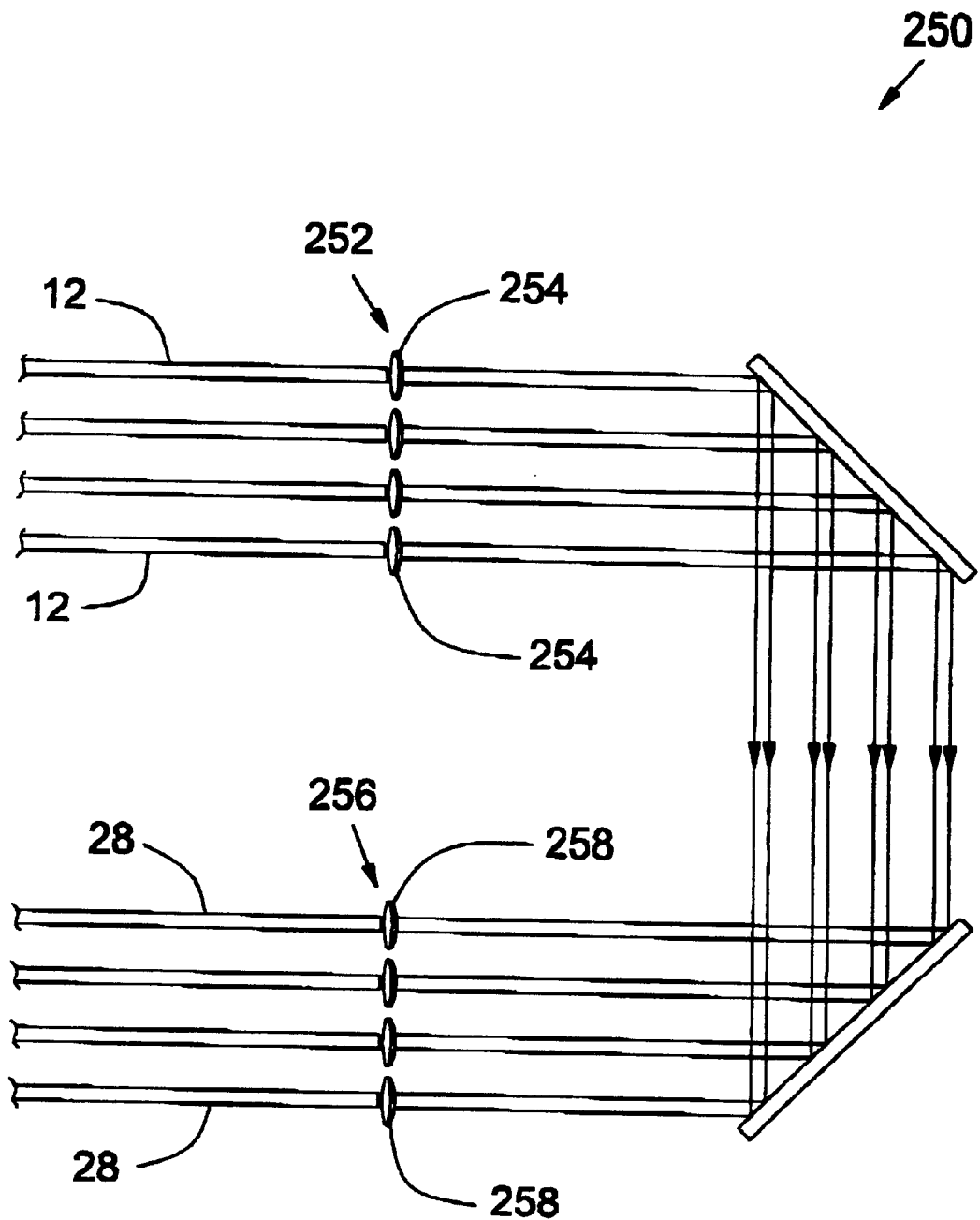
FIG. 5 is a schematic block diagram generally illustrating an alternative embodiment of the optical cross-switch device including collimating and focusing lens arrays.

FIG. 5 shows a schematic block diagram generally illustrating an alternative embodiment at 250 of the optical cross-switch device 10 (FIG. 1). In accordance with the depicted embodiment, the collimating lens 18 (FIG. 1) is replaced by an array 252 of collimating lenses 254 and the focusing lens 22 (FIG. 1) is replaced by an array 256 of focusing lenses 258. Each of the collimating lenses 254 is attached to an associated one of the input fibers 12. Similarly, Each of the focusing lenses 258 is attached to an associated one of the output fibers 28. In the depicted embodiment, the arrays 252 and 256 are both 1×4 arrays, but any number of individual collimating or focusing lenses equal to the number of input or output fibers may be used. The individual collimating lenses 254 and focusing lenses 258 are made of glass or plastic that transmit the proper communication wavelengths and can be fabricated by photolithographic, laser writing or molding, etc. To improve uniformity of manufacture, master copies of the collimating lens array 252 and focusing lens array 256 can be made and replicated. Using individual collimating lenses 254 for each input fiber 12 simplifies alignment and reduces the overall size of the system. Similarly, using individual focusing lenses 258 for each output fiber 28 also simplifies alignment and reduces system size.

Figure 6:
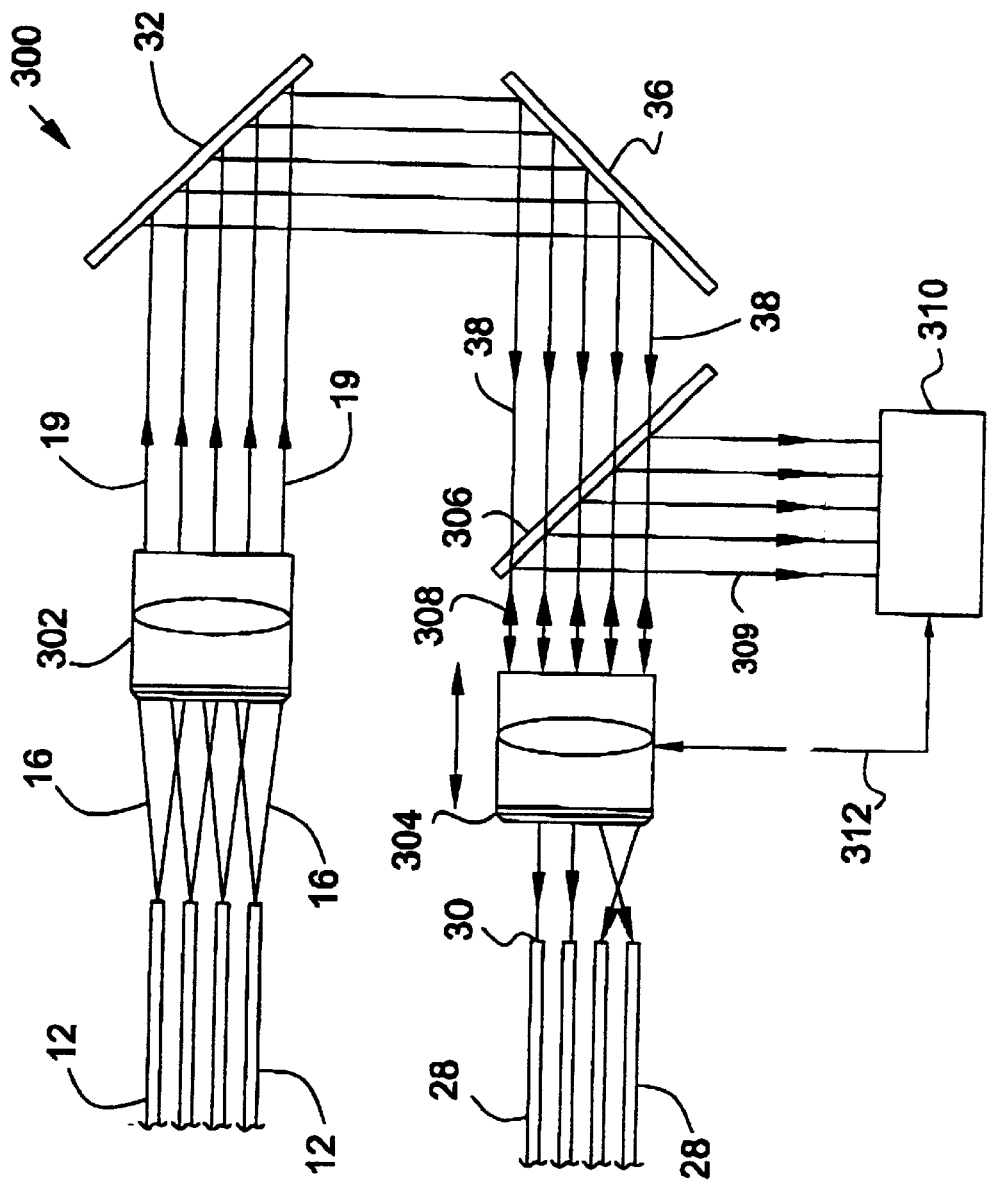
FIG. 6 is a schematic block diagram generally illustrating an optical cross-switch device in accordance with an alternative embodiment of the present invention.

FIG. 6 shows a schematic block diagram generally illustrating an optical cross-switch device at 300 in accordance with another alternative embodiment of the present invention. The depicted device 300 uses collimating optics 302 in place of the collimating lens 18 (FIG. 1) and focusing optics 304 in place of the focusing lens 22 (FIG. 1). In accordance with the depicted embodiment, the collimating optics 302 has a maximized coupling efficiency and a minimized insertion loss, the collimating optics 302 including one or more lenses with minimal optical aberrations.

The redirected light beams 38 pass through a beam splitter 306 without significant loss of energy. The redirected beams 38 are focused on to the associated output fiber ends 30 by the focusing optics 304. A small portion of the beams 38 are reflected back by the fiber ends 30 to create reflected beams 308 that are impinged upon the beams splitter 306 via focusing optics 304. The beam splitter 306 is operative to redirect the reflected beams 308 to provide redirected beams 309 toward an auto-focus and tracking mechanism 310. The auto-focus and tracking mechanism 310 is operative to provide servo signals via a line 312 in response to the reflected redirected beams 309. The auto-focusing and tracking mechanism 310 is an electro-optical system that includes a quad cell photodetector array communicatively coupled with a control circuit. In an alternative embodiment an auto-focus and tracking mechanism 310 similar to those typically used in video compact disk players may be used. The focusing optics 304 is further operative to move in response to the servo signals via the line 312 in order to properly focus the beams 38 onto the associated output fiber ends 30, thereby minimizing transmission losses and maximizing coupling efficiency.

Figure 7:
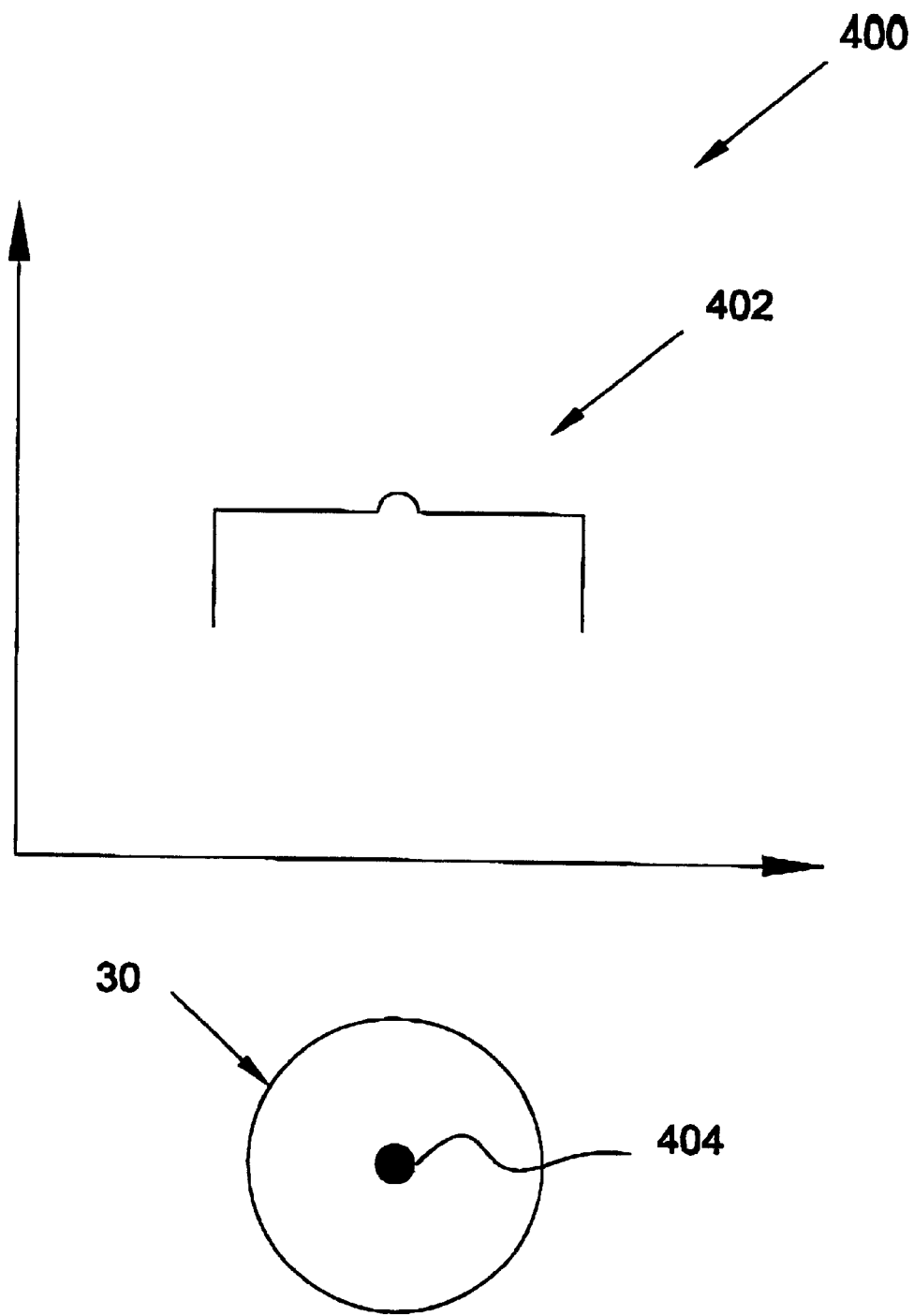
FIG. 7 is a schematic block diagram generally illustrating the distribution of reflectance across an output fiber end in accordance with one embodiment of the present invention.

FIG. 7 shows a schematic block diagram generally illustrating the distribution at 400 of reflectance across an output fiber end 30 in accordance with one embodiment of the present invention. The graph at 402 illustrates the reflectivity across the fiber end 30. As shown in the graph 402, reflectivity varies across the fiber end 30, peaking at the core 404. The reflected beams 308 (FIG. 6) reflecting off of the fiber ends 30 have intensity variations caused by the variation in reflectivity across the fiber ends 30.

Figure 8:
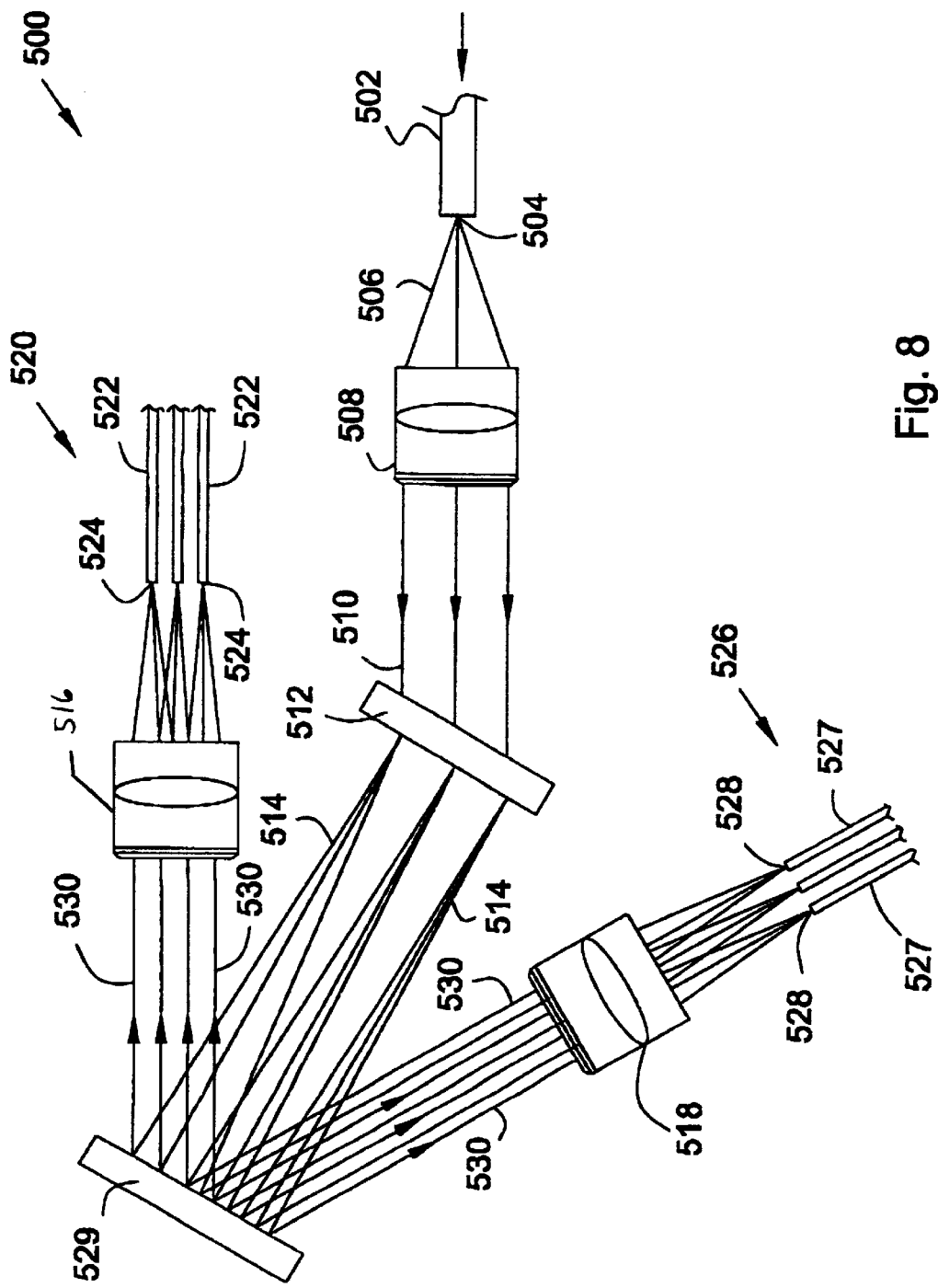
FIG. 8 is a schematic block diagram generally illustrating a wavelength selective optical add/drop multiplexing device in accordance with an alternative embodiment of the present invention.

FIG. 8 shows a schematic block diagram generally illustrating a wavelength selective optical add/drop multiplexing device at 500. In accordance with the preferred embodiment, the device 10 provides for multiplexing a multi-channel beam into a plurality of single channel beams and directing those single channel beams to selected ones of a plurality of fiber optic lines. The device 500 includes: an input fiber mounting assembly (not shown) for securing an input fiber 502 terminating in a fiber end 504 for radiating an associated multi-channel light beam 506; a collimating lens 508 for collimating the multi-channel light beam 504 to provide a collimated multi-channel light beam 510; a transmissive diffraction grating 512 for spatially separating the multi-channel beam 510 into a plurality of spatially separated single channel beams 514; a first focusing lens 516 for focusing light beams incident thereon; a second focusing lens 518 for focusing light beams incident thereon; a first output fiber mounting assembly (not shown) for securing a first output fiber array 520 including a plurality of output fibers 522 each terminating in an output fiber end 524 for receiving an associated one of the light beams focused by the first focusing lens 516; a second output fiber mounting assembly (not shown) for securing a second output fiber array 526 including a plurality of output fibers 527 each terminating in an output fiber end 528 for receiving an associated one of the light beams focused by the second focusing lens 518; a mirror unit 529 having at least one reflective element (not shown) for selectively redirecting an associated one of the collimated single channel light beams 514 to provide an associated one of a plurality of first redirected light beams 530 toward an associated one of the first output fiber ends 524 of the first output fiber array 520 via the first focusing lens 516, or toward an associated one of the second output fiber ends 528 via the second focusing lens 518.

In accordance with one embodiment, the transmissive dispersion grating 512 is a volume phase grating, such as that discussed in "Dichromated Gelatin for the Fabrication of Holographic Optical Elements" prepared by B. J. Chang and C. D. Leonard: Applied Optics, 18, 2407–2417 (1979). Volume Phase Gratings (VPG) provide very high optical dispersion causing light of differing wavelengths to be diffracted at different angles. The transmissive dispersion grating 512 includes at least one substrate (not shown) and a diffractive element (not shown). The diffractive element is preferably a holographic element including a photosensitive medium such as a photo-polymer material or DCG (e.g., dichromate gelatin) that provides a volume hologram. The photosensitive media are preferably materials that provide for high spatial resolution in order to provide a diffractive element having a high groove density, thus providing high spectral resolution. Moreover, the photosensitive media are preferably materials that have low scatter, low optical noise and are capable of transmitting a range of wavelengths of interest. The photosensitive medium provides for a high diffractive efficiency and wide waveband operation.

In one embodiment, the transmissive dispersion grating 512 includes a light sensitive diffractive element (not shown) disposed between a first and second substrates (not shown). Each of the first and second substrates may be formed from low scattering glass having surfaces coated with an anti-reflective coating to enhance the passage of radiation. The fabrication of Dichromated Gelatin and photopolymer holographic elements for different purposes has been described in "Dichromated Gelatin for the Fabrication of Holographic Optical Elements" Id.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An optical cross switch device for selectively switching light beams between a plurality of fiber optic elements, comprising:

an input fiber mounting assembly for securing at least one input fiber terminating in a fiber end for radiating an associated input light beam;

collimating means for collimating said at least one input light beam;

an output fiber mounting assembly for securing at least one output fiber terminating in an output fiber end for receiving an associated light beam;

focusing means for focusing said collimated input light beams onto associated ones of the output fiber ends, said focusing means including focusing optics and an auto-focusing and tracking mechanism, said focusing optics being responsive to a servo signal and operative to move in response to said servo signal to focus said collimated input light beams onto said associated fiber ends, said mechanism being responsive to optical beams reflected from said output fiber ends and operative to generate said servo signal; and at least one mirror unit having at least one reflective element for selectively redirecting an associated one of the collimated input light beams toward an associated selected one of said output fiber ends via said focusing means.

2. An optical cross switch device as recited in claim 1 wherein said at least one mirror unit includes a first mirror unit and a second mirror unit each including an array of said reflective elements, wherein each of said reflective elements is selectively rotatable about at least one axis for redirecting light beams incident thereon, and wherein each of said reflective elements of said first mirror unit provides for redirecting said associated light beam to impinge upon an associated one of said reflective elements of said second mirror unit, and further wherein each of said reflective elements of said second mirror unit is operative to redirect said associated light beam toward said associated output fiber.

3. An optical cross switch device as recited in claim 1 wherein each said reflective element is selectively rotatable about two substantially perpendicular axes.

4. An optical cross switch device as recited in claim 2 wherein each said reflective element is flexibly mounted on a substrate such that the angle of rotation of said reflective element is controlled by the application of voltage between at least a portion of said reflective element and at least a portion of said substrate.

5. An optical cross switch device as recited in claim 2 wherein said focusing optics includes an array of focusing lenses, each said focusing lens having a diameter and a focal length matching a numerical aperture of an associated one of said output fibers and also matching a size of a corresponding one of said reflective elements of said second mirror unit.

6. An optical cross switch device as recited in claim 2 wherein said collimating means includes an array of collimating lenses.

7. An optical cross switch device as recited in claim 1 wherein said input light beam is a multi-channel beam, said optical cross switch further comprising a transmissive volume phase grating for diffracting said multi-channel beam into a plurality of spatially separated single channel beams.

8. An optical cross switch device as recited in claim 1 wherein said input light beam is a multi-channel beam, said optical cross switch further comprising a transmissive volume phase grating for diffracting said multi-channel beam into a plurality of spatially separated single channel beams such that at least one of said single channel beams is redirected by an associated one of said reflective elements toward a selected one of said output fiber ends via said focusing means.

9. An optical cross switch device as recited in claim 7 further comprising:

at least one additional output fiber mounting assembly for mounting additional output fibers each terminating in an associated fiber end; and an additional focusing means for focusing light beams incident thereon;

wherein at least one of said single channel beams is redirected by said at least one mirror unit toward a selected one of said additional output fiber ends via said additional focusing means.

10. An optical cross switch device as recited in claim 8 further comprising:

at least one additional output fiber mounting assembly for mounting additional output fibers terminating in fiber ends; and an additional focusing means for focusing light beams incident thereon;

wherein at least one of said single channel beams is redirected by said at least one mirror unit toward a selected one of said additional output fiber ends via said additional focusing means.

11. An optical cross switch device as recited in claim 8 wherein said transmissive grating includes a diffractive element formed from a photosensitive medium.

12. An optical cross switch device as recited in claim 11 wherein said photosensitive medium comprises photopolymer material.

13. A wavelength selective optical cross switch add/drop multiplexer, comprising:

an input fiber mounting assembly for securing at least one input fiber terminating in a fiber end for radiating at least one associated multi-channel input light beam;

collimating means for collimating said at least one multi-channel beam;

at least one focusing means for focusing light beams incident thereon;

an output fiber mounting assembly for securing at least one output fiber terminating in an output fiber end for receiving an associated light beam;

a transmissive volume phase grating for diffracting said at least one multi-channel beam into a plurality of spatially separated single-channel beams; and at least one mirror unit having at least one reflective element for selectively redirecting an associated one of said single-channel beams toward a selected one of said output fiber ends via said focusing means.

14. A wavelength selective optical cross switch add/drop multiplexer as recited in claim 13, further comprising:

an additional focusing means for focusing associated single-channel beams redirected by said mirror unit; and an additional output fiber mounting assembly for securing at least one additional output optical fiber terminating in a fiber end for receiving at least one associated single-channel beam redirected by said mirror unit and propagating through said additional focusing means, wherein said mirror units redirect selected ones of said single-channel beams such that said selected single-channel beams are received by a selected one of said output fiber ends.

15. A wavelength selective optical cross switch add/drop multiplexer as recited in claim 13 wherein said mirror unit includes an array of reflective elements each being selectively rotatable about at least one axis for redirecting an associated one of said light beams which is incident thereon.

16. A wavelength selective optical cross switch add/drop multiplexer, comprising:

an input fiber mounting assembly for securing at least one input fiber terminating in a fiber end for radiating at least one associated multi-channel input light beam;

collimating means for collimating said at least one multi-channel beam;

at least one focusing means for focusing light beams incident thereon;

an output fiber mounting assembly for securing at least one output fiber terminating in an output fiber end for receiving an associated light beam;

a transmissive grating for diffracting said at least one multi-channel beam into a plurality of spatially separated single-channel beams; and at least one mirror unit having an array of reflective elements, each said reflective element being selectively rotatable about two substantially perpendicular axes for selectively redirecting an associated one of said single-channel beams toward a selected one of said output fiber ends via said focusing means.

17. A method for cross switching optical signals, comprising the steps of:

receiving at least one optical beam;

collimating said optical beam using at least one collimating means;

redirecting said collimated optical beam using at least one mirror unit including an array of reflective elements that are controllable to rotate about at least one axis to a selected position in order to redirect said collimated beam toward an associated one of a plurality of output fiber ends;

receiving at least one optical beam reflected from said output fiber ends at an auto-focusing and tracking mechanism;

using the mechanism to generate a servo signal in response to said reflected optical beams;

using focusing optics to focus the redirected optical beam toward an associated one of said output fiber ends; and moving said focusing optics in response to said servo signal to optimize said focusing of said redirected optical beam.

18. A method as recited in claim 17 further comprising the steps of:

diffracting said collimated optical beam using a transmissive volume phase grating into a plurality of single-channel optical beams;

redirecting at least one of said single-channel optical beams using at least one mirror unit, including an array of reflective elements each being rotatable about at least one axis for selectively redirecting optical beams incident thereon; and focusing at least one of said single-channel optical beams onto a selected one of a plurality of output fibers using a focusing means.

19. A method as recited in claim 17 wherein redirecting said single-channel optical beam includes:

receiving at least one collimated optical beam;

reflecting said collimated beam with a first reflective element of a first mirror unit toward a second reflective element of a second mirror unit;

redirecting the reflected collimated beam with said second reflective element toward a selected output fiber via said focusing means.

* * * * *